T. CAVANAUGH.
TROLLEY WHEEL.
APPLICATION FILED MAY 17, 1912.
1,099,022.
Patented June 2, 1914.
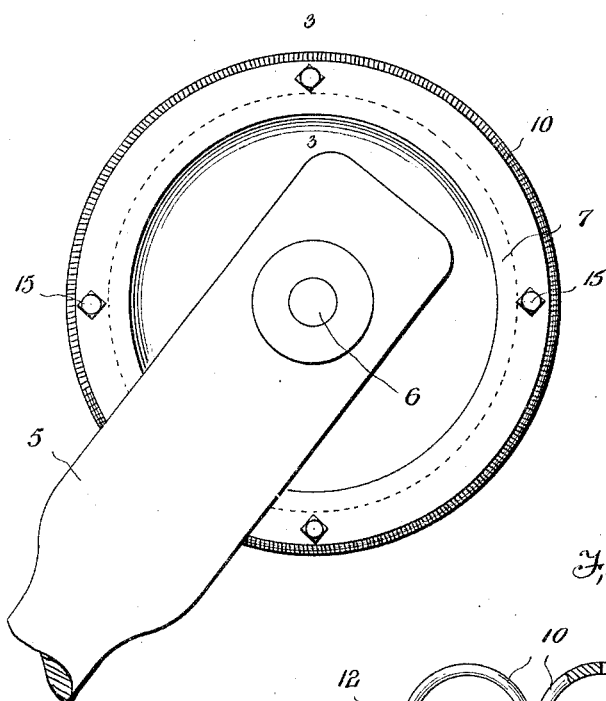
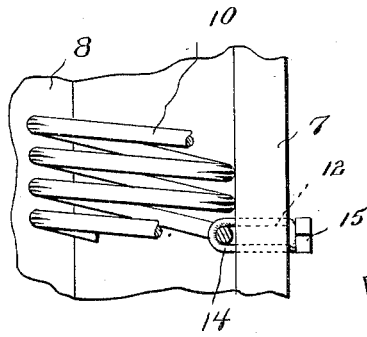
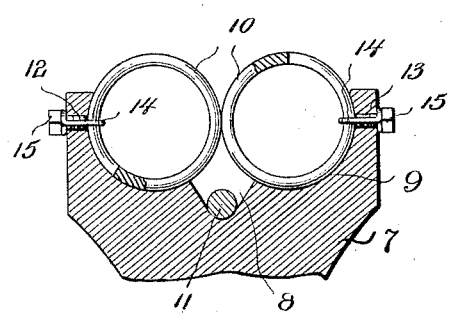
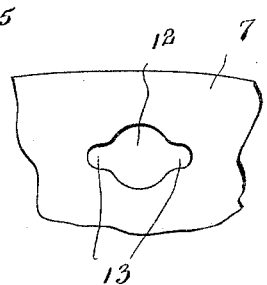
Inventor
Thomas Cavanaugh.
Witnesses
William Smith
E. L. Mueller
By Victor J. Evans
Attorney

UNITED STATES PATENT OFFICE.

THOMAS CAVANAUGH, OF PITTSBURGH, PENNSYLVANIA.

TROLLEY-WHEEL.

1,099,022. Specification of Letters Patent. Patented June 2, 1914.

Application filed May 17, 1912. Serial No. 697,937.

*To all whom it may concern:*

Be it known that I, THOMAS CAVANAUGH, a citizen of the United States, residing at Pittsburgh, in the county of Allegheny and State of Pennsylvania, have invented new and useful Improvements in Trolley-Wheels, of which the following is a specification.

The general object of this invention is the provision of a trolley wheel constructed in a novel manner whereby means may be applied thereto for engaging the trolley wire for preventing the same from becoming detached from said wheel during the rotation thereof.

In carrying out the objects of the invention generally stated above, it will be understood, of course, that the essential features thereof are susceptible to changes in details and structural arrangements, one preferred and practical embodiment being shown in the accompanying drawing, wherein:—

Figure 1 is a side elevation of the trolley wheel constructed in accordance with the invention. Fig. 2 is an edge elevation thereof. Fig. 3 is a section on the line 3—3 of Fig. 1. Fig. 4 is a fragmentary side elevation of the wheel showing one of the apertures therein for receiving a fastening element.

Referring more particularly to the accompanying drawing in which like reference characters designate similar parts, 5 indicates a harp of the ordinary well known construction, the same having a shaft 6 journaled in its upper end. The trolley wheel 7 is mounted upon said shaft in any well known manner and is provided in its periphery with an annular trolley wire receiving channel 8. Contiguous to said channel at its outer ends, said wheel is provided with oppositely disposed annular grooves 9 adapted to form seats for the reception of a pair of coiled springs 10 which are adapted to overhang the channel 8 and normally abut against each other whereby the wire 11 is retained within said channel.

The sides of the wheel 7 are provided adjacent their peripheries with a plurality of threaded openings 12 and formed contiguous to these openings and communicating therewith are the oppositely disposed recesses 13 which are adapted to receive the limbs of U-shaped wire fasteners 14, the inner closed ends of which are adapted to engage one of the coils of the adjacent spring 10. A threaded fastening bolt 15 having the head 16 is then threaded into each of the openings 12 thus preventing the displacement of the wire fastener 14. The free ends of the fastener 14 may then be wound about the bolt 15 thus further preventing the displacement of said fastener. When the bolts are in the position just described, it will be seen that the same will engage the wire fasteners and retain them in the recesses 13 and by reason of the fact that the inner ends of said fasteners engage the springs 10, it will be obvious that displacement of said springs will also be prevented. It will of course be obvious that the trolley wire will continuously disengage from the spring 10 during the rotation of the wheel and by reason of the flexibility of the said springs, the same will be caused to assume their normal position whereby a portion of the wire is at all times inclosed within the channel 8, it being understood that the usual springs carried by the roof of the car and engaging the trolley pole will act as an additional force to maintain the wheel in engagement with the wire.

From the foregoing description taken in connection with the accompanying drawing, it will be seen that the invention contemplates providing a trolley wheel which is simple in construction thus reducing the cost of manufacture of the same to a minimum and which is durable and effective in carrying out the purpose for which it is designed.

What is claimed is:—

1. A device of the class described comprising a trolley wheel having an annular channel, and coiled springs encircling the periphery of said wheel and adapted to normally overhang said channel.

2. A device of the class described comprising a trolley wheel having an annular channel, coiled springs encircling the periphery of said wheel and adapted to normally overhang said channel, and means extending transversely through said wheel and engaging said coil springs for retaining the same in position.

3. A device of the class described comprising a trolley wheel having an annular channel, coiled springs encircling the periphery of said wheel and adapted to normally overhang said channel, said wheel being provided in its sides with a plurality of transverse openings, and means in said openings and engaging said coiled springs for retaining the latter in position.

4. A device of the class described comprising a trolley wheel having an annular channel, coiled springs encircling the periphery of said wheel and adapted to normally overhang said channel, said wheel being provided in its sides with a plurality of transverse openings, means in said openings and engaging said coiled springs for retaining the latter in position, and means engaging said last named means for preventing displacement thereof.

5. A device of the class described comprising a trolley wheel having an annular channel, coiled springs encircling the periphery of said wheel and adapted to normally overhang said channel, said wheel being provided in its sides with a plurality of transverse openings, recesses communicating with said openings, U-shaped fasteners engaging said recesses and said coiled springs for retaining the latter in position, and securing elements mounted in said openings and engaging said fasteners for preventing displacement thereof.

In testimony whereof I affix my signature in presence of two witnesses.

THOMAS CAVANAUGH.

Witnesses:
   DANIEL WAVEK,
   ANDREW ALMASH.

---

Copies of this patent may be obtained for five cents each, by addressing the "Commissioner of Patents, Washington, D. C."